United States Patent [19]

Schootstra et al.

[11] Patent Number: 5,784,272

[45] Date of Patent: Jul. 21, 1998

[54] CONTROL SYSTEM FOR A PROCESS THAT EXHIBITS PERIODIC DISTURBANCES

[75] Inventors: Gerrit Schootstra; Maarten Steinbuch, both of Eindhoven, Netherlands

[73] Assignee: U.S. Philips Corporation, New York, N.Y.

[21] Appl. No.: 546,434

[22] Filed: Oct. 20, 1995

[30] Foreign Application Priority Data

Oct. 28, 1929 [EP] European Pat. Off. ............ 94203147

[51] Int. Cl.$^6$ ............................................. H04B 5/00
[52] U.S. Cl. ................... 364/158; 364/148; 327/277; 327/250
[58] Field of Search .......................... 364/153, 154, 364/148, 158, 162; 327/250, 277, 279, 284; 455/296

[56] References Cited

U.S. PATENT DOCUMENTS

| | | | |
|---|---|---|---|
| 4,286,318 | 8/1981 | Immink et al. | 364/118 |
| 4,821,168 | 4/1989 | Gotou | 364/183 |
| 4,973,962 | 11/1990 | Shimizu | 341/166 |
| 5,493,588 | 2/1996 | Lennen | 375/343 |
| 5,638,022 | 6/1997 | Eatwell | 327/551 |

FOREIGN PATENT DOCUMENTS

| | | | |
|---|---|---|---|
| 2043964 | 10/1980 | United Kingdom | G05B 11/36 |
| 9400930 | 1/1994 | WIPO | H04B 15/00 |

*Primary Examiner*—James P. Trammell
*Assistant Examiner*—Shah Kaminis
*Attorney, Agent, or Firm*—Michael E. Belk

[57] ABSTRACT

In a control system a characteristic quantity of a process (1) exhibits a periodic disturbance. A measuring system (2) generates a measuring signal (Vm) which represents the characteristic quantity. A control device controls the process in response to the measuring signal (Vm). To reduce the periodic disturbance, the control device (3) comprises a delay circuit (4) which delays an input signal (Vin) related to the measuring signal (Vm) by a time interval (T) having the length of a period (Tp) of the periodic disturbance. The control device (3) comprises an analysis circuit (6) for deriving an analysis signal (Va) which is indicative of a deviation between the period of the periodic disturbance and the delay time. By means of a control circuit (13) and an adapter circuit (7), the delay time (T) is set in dependence on the analysis signal (Va) to a value for which the analysis signal (Va) indicates that the delay time (T) is equal to the period (Tp). A correlation system can be used for deriving the analysis signal (Va).

13 Claims, 4 Drawing Sheets

CONTROL SYSTEM FOR A PROCESS THAT EXHIBITS PERIODIC DISTURBANCES

FIELD OF THE INVENTION

The invention is related to the field of controlled processes and process control systems.

BACKGROUND OF THE INVENTION

The invention relates to a control system for a process with a control quantity that exhibits a periodic disturbance. The system includes measuring apparatus for controlling the quantity in response to the measuring signal and reducing the periodic disturbance. The control apparatus includes delay apparatus for delaying a measuring-signal-related input signal of the delay apparatus over a period of time equal the length of the period of the periodic disturbance. The system also includes apparatus for maintaining a relationship between the delay time and the period of the periodic disturbances.

The invention further relates to control apparatus to be used in such a control system, to a method of controlling a process, and to the overall controlled process.

The invention further relates to a measuring system.

A control system of the type defined above is known, for example, from GB-A-2043964, to which U.S. Pat. No. 4,286,318 corresponds. In that document, a control system is used in an optical read device for reading optically readable disc-shaped record carriers moved in a rotating fashion relative to an optical scanning device. The record carrier includes a helical track and the optical scanning device is kept aimed on the track by the known control system. During this operation the position of the optical scanning device is controlled in response to a servotrack error signal. Since the helical track is generally situated eccentrically around the point of rotation, and moreover, the windings of the track show eccentricity, the servotrack error signal will exhibit periodic disturbances. By using a clock-controlled digital delay circuit having a delay time that corresponds to the time of one revolution of the record carrier, a control is achieved which considerably suppresses the influence of the periodic disturbances on the servotracking. This high degree of suppression is obtained only for periodic disturbances whose period is accurately equal to or an integer portion of the delay time of the delay circuit. In the known system, this close relationship between the delay time and the period of the disturbances is established by controlling the digital delay circuit with a clock signal derived from a pulse disc arranged on the drive spindle of the motor driving the record carrier. Such a pulse disc, however, is very costly.

The above citations are hereby incorporated in whole by reference.

SUMMARY OF THE INVENTION

It is an object of the invention to provide a control system in which an accurate relationship between the period of the periodic disturbances and the delay time can be implemented fully electronically.

In a control system according to the invention, this object is achieved using apparatus for maintaining the relationship including analysis apparatus for deriving an analysis signal which indicates any deviation between the period of the periodic disturbance and the delay time, and apparatus for modifying the delay time of the delay apparatus in response to the analysis signal.

An embodiment for the control system is characterized in that analysis apparatus includes deriving apparatus for deriving as an analysis signal, a correlation measuring signal indicating the degree of correlation between the input signal and a delayed signal. The delayed signal is equal to the input signal, but is shifted in time relative to the input signal, by a time interval equal to M times the delay time T, where M is equal to Tm/Tp. Tp is the period of the periodic disturbances and Tm is a time shift for which the correlation between the input signal and a delayed version of the input signal exhibits a maximum or a minimum.

This embodiment is also based on the recognition that in a periodic signal, the correlation between this signal and a time-shifted version of this signal exhibits a maximum or a minimum for delay times which are equal to M/N times the period of the signal. By using the delay time, so that there is a maximum or minimum in the correlation, the delay time becomes accurately equal to the period of the periodic signal.

A further embodiment is characterized in that the control apparatus includes delay apparatus for deriving, by delay, a first, a second and a third auxiliary signal from the input signal. The second and third auxiliary signals are shifted in time by a first and a second time interval respectively, relative to the first auxiliary signal. The length of the first time interval is a given period of time shorter and the length of the second time interval. The second time interval is a given period of time longer than M times the delay time. The control apparatus also includes deriving apparatus for deriving as a correlation measuring signal, a difference signal indicating the difference between the correlation between the first and the second auxiliary signal; and the correlation between the first and the third auxiliary signal. In this embodiment the sign of the difference between the two correlations simultaneously changes with the sign of the deviation between the real delay time and the desired delay time. This is advantageous in that, based upon this difference, the delay time may be simply adjusted in the correct direction.

The latter embodiment for the control system includes a correlation system according to the invention, in which: the second and third auxiliary signals are shifted relative to the first auxiliary signal by a first and a second time interval respectively; the length of the first time interval is a given period of time shorter and the length of the second time interval is a given period of time longer than a reference time interval. The control system also includes deriving apparatus for deriving a difference signal indicating the difference between the correlation between the first and second auxiliary signals; and the correlation between the first and third auxiliary signals.

A further embodiment for the control system is characterized in that the deriving apparatus for deriving the difference signal, includes calculating apparatus for recurrently calculating the product of: the first auxiliary signal; and the difference between the second and third auxiliary signals. The deriving apparatus also includes calculating apparatus for calculating a running average of the calculated products.

This embodiment is also based on the recognition that changes in the period of the disturbances vary only slowly compared to the period of the disturbance, so that the calculated average yields a proper measure for the difference in correlations and thus yields a proper measure for the extent and sign of the deviation of the delay time.

Those skilled in the art will understand the invention and additional objects and advantages of the invention by studying the description of the preferred embodiments below with reference to the following drawings which illustrate the features of the appended claims.

DESCRIPTION OF THE PREFERRED EMBODIMENTS

Figure 1:
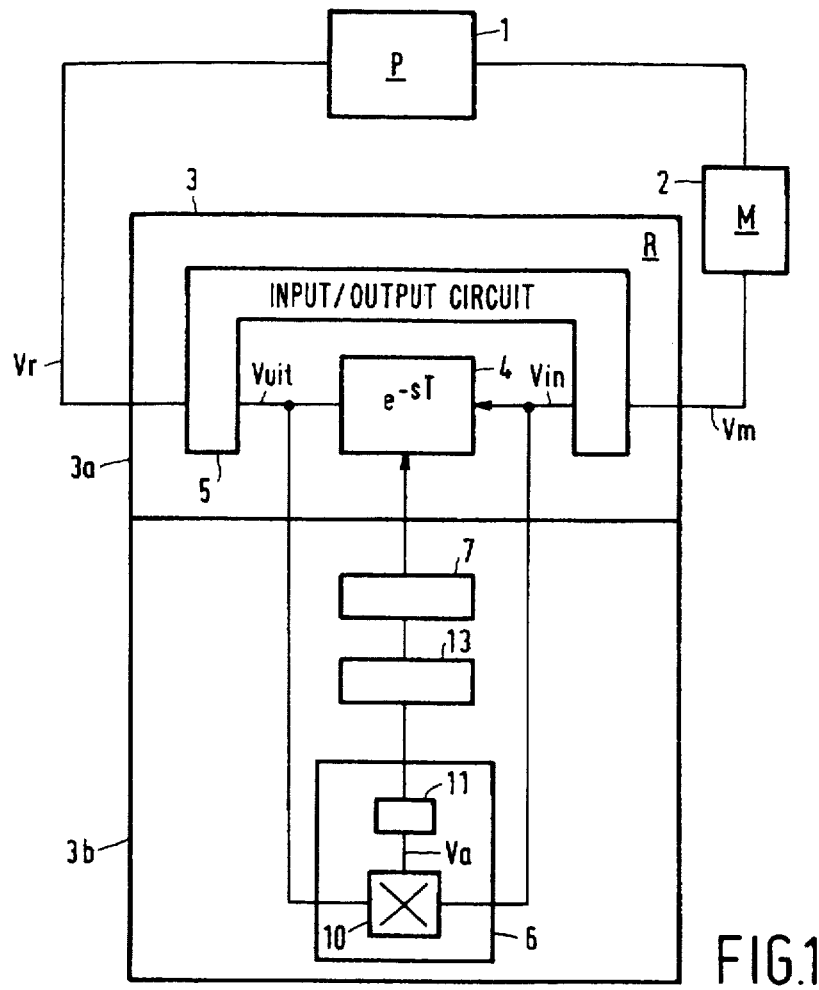
FIG. 1 shows a specific embodiment for a control system according to the invention.

FIG. 1 shows an embodiment for a control system according to the invention. The control system includes a process 1, a measuring device 2 for measuring a characteristic quantity of the process 1 and for producing a measuring signal Vm which is indicative of the measured quantity, and a control device 3 for supplying a control signal Vr to the process 1 to control the characteristic quantity in response to the measuring signal vm.

The process 1 is a process of a customary type in which the characteristic quantity exhibits a periodic disturbance. Such processes may be a transport process in which an object is driven by a rotating motor, such as, for example, the transport of a record carrier in an optical recording device, or the transport of a rotating head in a magnetic recording device. It will be obvious to a person skilled in the art that periodic disturbances may occur also in different processes than transport processes. The control device 3 includes a section 3a and a section 3b. The section 3a is of a known type which includes a delay circuit 4 for providing an enhanced suppression of the periodic disturbances. The delay circuit has a delay time T that corresponds to a period Tp of the periodic disturbances. The section 3a further includes a part 5 which supplies the delay circuit 4 with an input signal Vin related to the measuring signal Vm and derives the control signal Vr in depending on an output signal Vuit of the delay circuit 4. The operation of section 3a is not essential to understanding the invention and will therefore not be described in detail. For a detailed description of possible embodiments for section 3a as well as embodiments for the process 1 and measuring device 2, reference is made to GB-A 2043964 (to which U.S. Pat. No. 4,286,318 corresponds) and U.S. Pat. No. 4,821,168 which documents are hereby incorporated herein in whole by reference.

The enhanced suppression of the periodic disturbances only applies to disturbances whose periods Tp are accurately equal to (for the fundamental harmonic) or form an integer portion of (for the higher harmonic) the delay time T of the delay circuit 4.

A section 3b of the control device includes an analysis circuit 6 for deriving an analysis signal Va indicating a deviation between the period Tp of the fundamental harmonic of the periodic disturbance and the delay time T. Such a circuit may include, for example, a frequency analysis circuit of a customary type which determines the dominant frequency in the measuring signal and compares the period Tp corresponding to this dominant frequency with the delay time T. The analysis signal may then indicate to what degree the period Tp deviates from the delay time T. Furthermore, the section 3b includes a control circuit 13 and an adapter circuit 7. The adapter circuit 7 is of a customary type by which the delay time T of the delay circuit can be adjusted. The control circuit 13 is of a type that sets, in response to the analysis signal Va, the delay time T to a value at which the analysis signal Va indicates that the delay time T corresponds to the period Tp. In the case where the delay circuit includes a series of consecutive memory elements in which the information in the memory elements is constantly shifted to next memory elements in response to a clock pulse, the adapter circuit may include an oscillator controlled by an analysis signal. The oscillator generates the clock pulses for controlling the delay circuit. Preferably, a so-called "cyclic" memory is used as a delay circuit, in which the pointers to the initial and final addresses of the memory are constantly changed in response to the clock. By adjusting the frequency of the clock signal, the speed at which information is shifted through the memory, and thus the delay time T, is controlled. Control of the delay time T, may also be implemented by adjusting the number of memory elements between the input and output of the delay circuit. This may be simply implemented by selecting for the production of the output signal Vuit, a memory element from the series of memory elements in response to the analysis signal Va.

Figure 2:
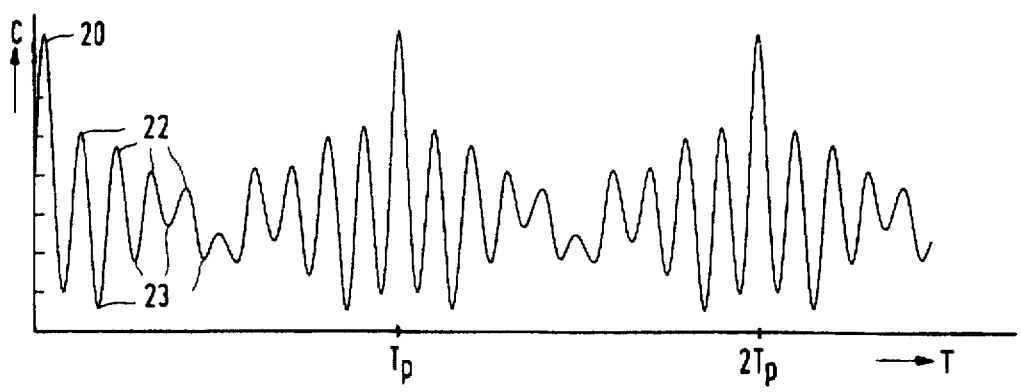
FIGS. 2 and 4 show correlations between signals shifted in time relative to each other.

In the embodiment shown in FIG. 1, the analysis circuit includes a correlator of a customary type, deriving as an analysis signal, a correlation measuring signal indicating the degree of correlation between the input signal Vin and a delayed signal. The delay signal is equal to the input signal, but shifted in time relative to the input signal Vin, by a time interval equal to the delay time T. In the embodiment shown in FIG. 1, the output signal Vuit is used for the delayed signal. The time average of the product of the signals Vin and Vuit may serve as a measure for the correlation between the input signal Vin and the output signal Vuit. For determining the correlation, the analysis circuit may include a multiplier 10 for calculating the product of the signals Vin and Vuit, and a low-pass filter 11 for filtering the output signal of the multiplier to determine the time average of the product of Vin and Vuit. The correlation between the signals Vin and Vuit shows a maximum where the period Tp is a multiple of the delay time. After all, for this value of the delay time, the signals Vin and Vuit are equal, except for several non-periodic disturbances, and thus exhibit a maximum correlation. By way of illustration, FIG. 2 shows in a curve 20, with the degree of correlation C between the signals Vin and Vuit plotted against delay time T.

The control circuit 13 may be of a type, that varies the set delay time in a setting cycle, and then determines the optimum setting of the delay time based upon the corresponding values of the analysis signal Va, and then sets the delay time T to the optimum value. The setting cycle may be performed once, for example, when the control system is switched on. Alternatively, it is possible to repeat the setting cycle at regular intervals.

Figure 3:
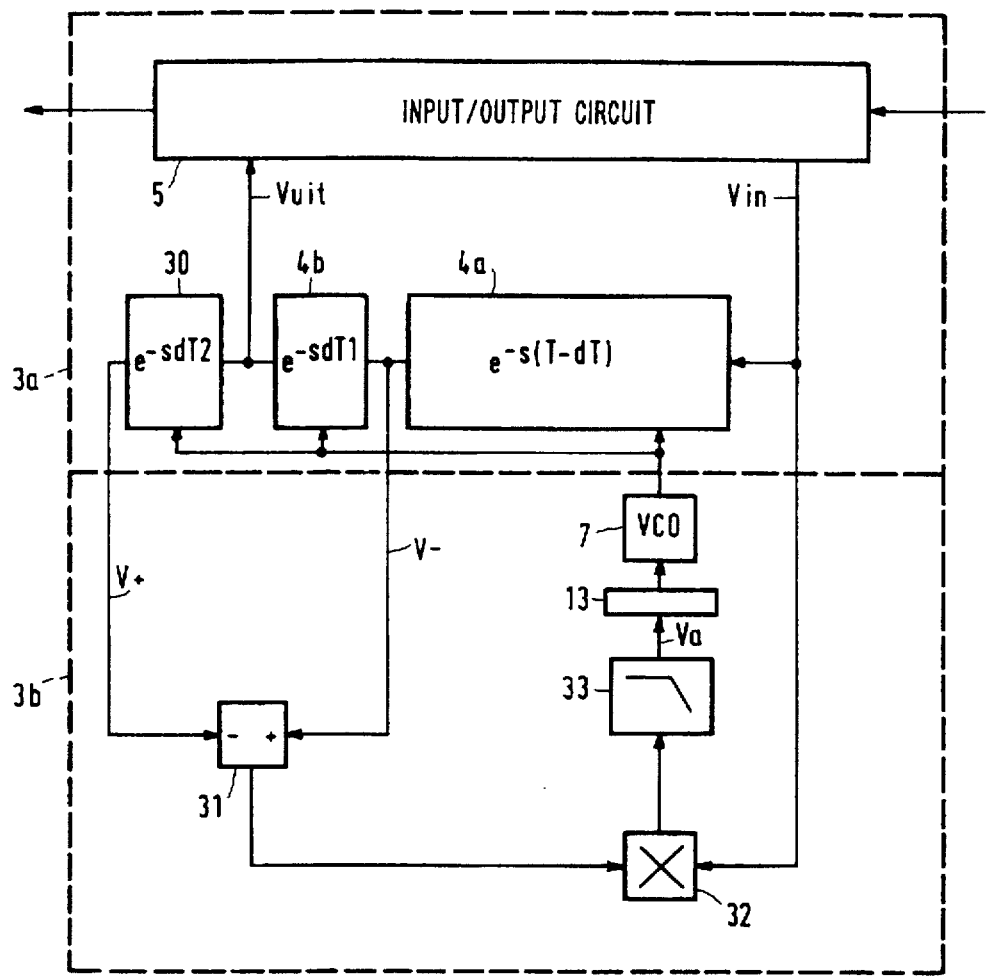
FIGS. 3 and 5 show other specific embodiments for a control device according to the invention.
Figure 4:
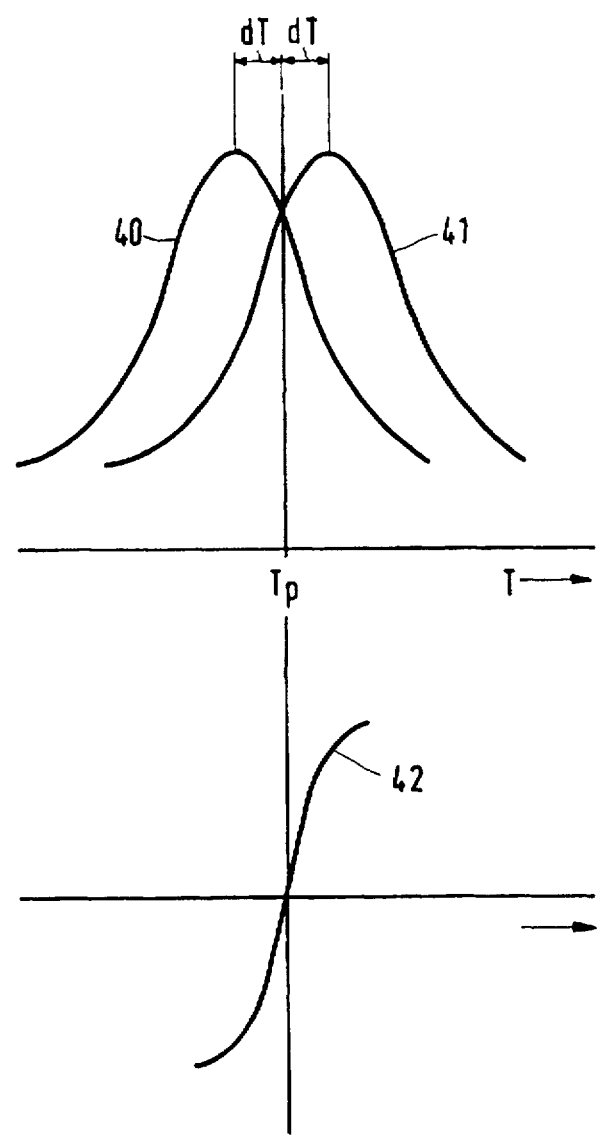

FIG. 3 shows a further embodiment for the control device 3 according to the invention. In this embodiment, the delay circuit 4 is split up into two sections i.e. a first section 4a having a delay time T-dT1 and a second section 4b having a delay time dT1. The total delay between the input signal Vin and the output signal Vuit caused by the sections 4a and 4b, is thus equal to T. The output signal of the section 4a having a delay time T-dT1, will henceforth be referenced V−. The output signal Vuit is not only supplied to the section 5, but also to a delay circuit 30. Delay circuit 30 delays the signal Vuit by a time dT2. This delayed signal will henceforth be referenced V+. The signals V− and V+ are shifted in time relative to the signal Vin by a time $T-dT_1$, $T+dT2$, respectively. FIG. 4 shows in a curve 40, the correlations C− between the signal Vin and the signal V− plotted against delay time T. In a curve 41 are shown, the correlations C+ between the signal Vin and the signal V+ plotted against delay time T. The values of dT1 and dT2 are selected such that, the curves 40 and 41 intersect at T equal to the period Tp. Generally, the correlation curves for periodic disturbances for small areas around the maximum, are to be considered symmetrical. This means that the values of dT1 and dT2 may generally be selected to be equal to each other. FIG. 4 shows in a curve 42, the difference between the correlations C+ and C− plotted against delay time T. This difference is positive for the case where, the delay time T exceeds the period Tp, and negative for the case where, the delay time T is smaller than Tp. Thus, it may be detected, based upon the sign of the difference, whether the set delay time T is too large or too small. This difference is thus pre-eminently suitable as an analysis signal Va.

For determining the signal Va indicating the difference between C+ and C−, the section 3b of the control device 3 includes a difference circuit 31, a multiplier 32 and an averaging circuit 33. The signals V+ and V− are fed to the inputs of the difference circuit 31. The difference circuit 31 applies to an input of the multiplier, a signal indicating the difference between V+ and V−. Another input of the multiplier 32 is supplied with the signal Vin. On an output of the multiplier 32, is produced a signal indicating the product of the signals received on its inputs. The signal produced on the output of the multiplier 32, is fed to the averaging circuit 33. The averaging circuit 33 is of a customary type, for example, a low-pass filter, which produces a signal that is a time-averaged version of the received signal. The signal Va indicating the difference between C+ and C−, is available on the output of the averaging circuit 32. The signal Va is then fed to the control circuit 13 which increases or reduces the delay time T, depending on the sign and quantity of the signal Va.

Figure 5:
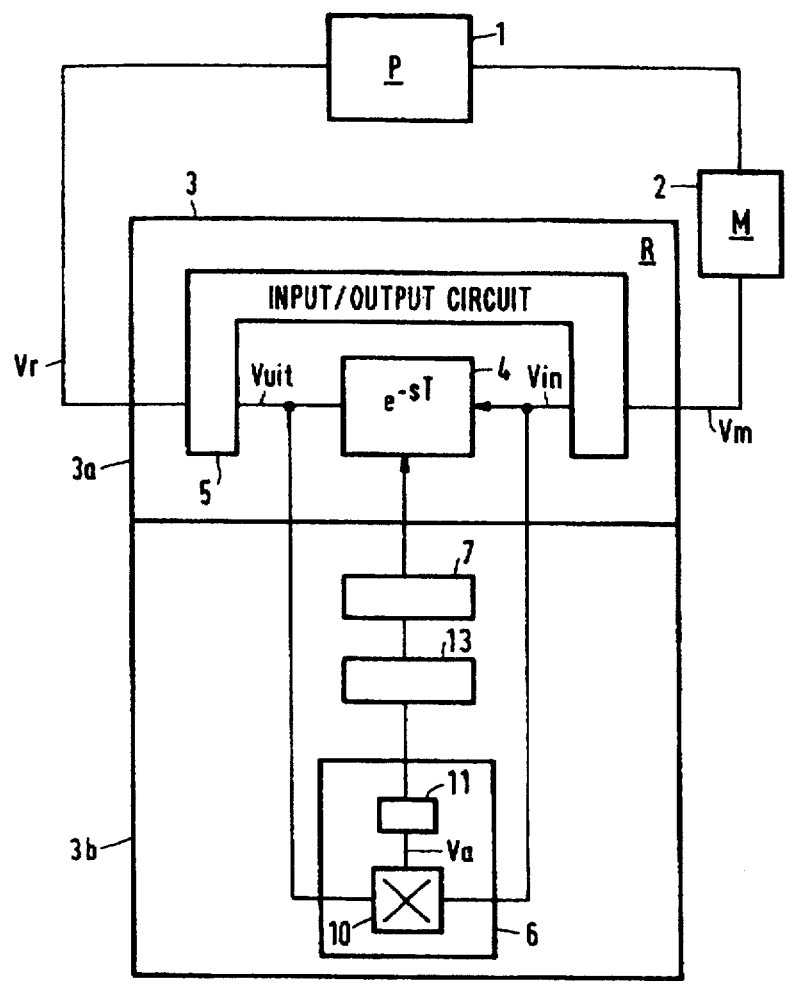

FIG. 5 shows yet another embodiment for the control device according to the invention, in which the components corresponding to those in embodiments already described are referenced by like reference characters. The section 3a of the control device 3 includes not only the delay circuit 4, but also a second delay circuit 50 for delaying the output signal Vuit by a delay time T. On the output of the delay circuit 50, is produced a signal Vuit', which is delayed relative to the signal Vuit, by a time interval T and thus, by a time interval 2T relative to Vin. The signals Vuit and Vuit' are fed to the section 5 which, depending on these signals, derives the control signal Vr for controlling the process 1. From branches of the delay circuit 30 and 4, are taken signals Vi, V+ and V−, so that the signals V+ and V− are shifted in time relative to the signal V−, by T+dT2 and T−dT1, respectively. The analysis signal Va is derived, in similar fashion to that of the embodiment shown in FIG. 3, from the signals V+, V− and Vi.

It is observed that the sections 4a, 4b, 30, 31 and 33 together form a correlation system for determining, based upon correlation techniques, whether a period of the signal fed to the device (in this case Vin) deviates from the time interval that has a given reference length (in this case T). The use of this correlation system is not restricted to embodiments of a type as shown in FIG. 3, which include a feedback for adjusting the delay time 5 depending on the signal Va produced by the correlation device. The correlation device may be used, in principle, wherever measurements are to be made or a period accurately corresponds to a reference period, such as, for example, when musical instruments are being tuned.

In the embodiments described above, the delay time T is set to a value at which, the correlation between two signals that have been shifted by a time interval T, is maximized. After all, this maximum correlation occurs in the case where T is equal to the period Tp of the periodic disturbances. It should be observed, that for values of T equal to a multiple of Tp, the correlation also exhibits a maximum. Thus the delay time T can also be set based upon a signal indicating the correlation between two signals mutually shifted by an integer multiple of the delay time T.

Furthermore, it is observed that, generally a periodic disturbance includes not only a fundamental harmonic, but also a number of higher harmonics having frequencies which are an integer multiple of the frequency of the fundamental harmonic. The presence of such higher harmonics results in local maximums and local minimums in the correlation curve. FIG. 2 shows a number of these local maximums referenced 22 and a number of the local minimums referenced 23. It will be evident to a person skilled in the art, that the delay time T can also be set based upon the position of a local minimum or local maximum. This may be implemented by determining whether a maximum or minimum occurs in the correlation in the case of time shifts M times T, where M is equal to Tm/Tp, and where Tm is the time shift at which a local minimum or a local maximum occurs in the correlation.

Setting the delay time T based upon a local maximum, may be implemented using, for determining the correlation, signals that are not shifted by a time interval T, but by a time interval M*T. For the embodiments of FIGS. 3 and 5, a setting may be obtained based upon a local maximum by using, for determining the correlation, signals that are not shifted by time intervals T+dT2 and T−dT1, but by time intervals M*T+dT2 and M*T−dT1. A setting based upon local minimums in the correlation may be obtained by setting the delay time to values for which the analysis signal Va indicates a minimum correlation between the time-shifted signals.

The embodiments of the control system 3 described above are all implemented by so-called hard-wired circuits. It will be evident for a person skilled in the art, that the control system can just as well be implemented by so-called program-controlled circuits, such as, for example, a microcomputer.

We claim:

1. A system for a process with a control quantity that exhibits a periodic disturbance, comprising:
    processing apparatus for operating the process;
    measuring means for generating a measuring signal that represents the control quantity that exhibits the periodic disturbance;
    means for receiving the measuring signal and providing a measuring-signal-related input signal;
    input delay means for delaying the measuring-signal-related input signal for a delay time approximately equal to the length of a period of the periodic disturbance;
    means for maintaining a relationship between the delay time and the period of the periodic disturbances, including:
        analysis means for deriving an analysis signal indicating a deviation between the period of the periodic disturbance and the delay time; and
        means for adjusting the delay time of the delay means in response to the analysis signal; and
    output means for providing a control signal to the processing apparatus depending on the delayed measuring-signal-related input signal, to control the quantity so as to reduce the periodic disturbances.

2. The system of claim 1, in which:

analysis means include correlation means for deriving as an analysis signal, a correlation measuring signal indicating the degree of correlation between the input signal and a delayed signal equal to the input signal but shifted in time relative to the input signal by a time interval equal to M times the delay time T;

M is equal to Tm/Tp;

Tp is the period of the periodic disturbances; and

Tm is a time shift for which the correlation between the input signal and a delayed version of the input signal exhibits a maximum or a minimum.

3. The system of claim 2, further comprising:

auxiliary delay means for deriving, by delay, a first, a second and a third auxiliary signal from the input signal, the second and third auxiliary signals are shifted in time by a first and a second time interval respectively, relative to the first auxiliary signal, the length of the first time interval is a given period of time shorter and the length of the second time interval being a given period of time longer than M times the delay time; and difference means for deriving as a correlation measuring signal, a difference signal indicating the difference of:

the correlation between the first and the second auxiliary signal; and the correlation between the first and the third auxiliary signal.

4. The system of claim 3, in which the deriving means for deriving the difference signal include:

auxiliary product means for recurrently calculating the product of: the first auxiliary signals and the difference between the second and third auxiliary signals; and average means for calculating a running average of the calculated products.

5. The system of claim 2, in which M is equal to 1.

6. Control apparatus comprising:

input delay means for delaying a measuring-signal-related input signal for a delay time equal to the length of a period of a periodic disturbance; and means for maintaining a relationship between the delay time and the period of the periodic disturbances, including:

analysis means for deriving an analysis signal indicating a deviation between the period of the periodic disturbance and the delay time; and means for adjusting the delay time of the delay means in response to the analysis signal.

7. A correlation system comprising:

auxiliary means for generating a first, a second and a third auxiliary signal, the second and third auxiliary signals are shifted by a first and a second time interval respectively relative to the first auxiliary signal, the length of the first time interval is a given period of time shorter and the length of the second time interval is a given period of time longer than a reference time interval; and difference means for deriving a difference signal indicating the difference of:

the correlation between the first and the second auxiliary signal; and the correlation between the first and the third auxiliary signal.

8. The correlation system of claim 7, in which the deriving means include:

product means for recurrently calculating the product of: the first auxiliary signals and the difference between the second and third auxiliary signals; and average means for calculating a running average of the calculated products.

9. A correlation system comprising:

auxiliary means for generating a first, a second and a third auxiliary signal, the second and third auxiliary signals are shifted by a first and a second time interval respectively relative to the first auxiliary signal, the length of the first time interval is a given period of time shorter, and the length of the second time interval is a given period of time longer than a reference time interval; and analysis means for deriving a difference signal indicating differences in correlations between the first, second and third auxiliary signals; and for recurrently calculating products related to the auxiliary signals.

10. The system of claim 1 in which:

the analysis means include correlation means for deriving as an analysis signal, a correlation measuring signal indicating the degree of correlation between: the input signal; and a delayed signal equal to the input signal but shifted in time relative to the input signal by a time interval equal to M times the delay time T;

M is equal to Tm/Tp;

Tp is the period of the periodic disturbances;

Tm is a time shift for which the correlation between the input signal and a delayed version of the input signal exhibits a maximum or a minimum;

the system further comprises auxiliary means for deriving, by delay, a first, a second and a third auxiliary signal from the input signal, the second and third auxiliary signals are shifted in time by a first and a second time interval respectively, relative to the first auxiliary signal, the length of the first time interval is a given period of time shorter, and the length of the second time interval is a given period of time longer than M times the delay time;

the system further comprises difference means for deriving as a correlation measuring signal, a difference signal indicating the difference of:

the correlation between the first and the second auxiliary signal; and the correlation between the first and the third auxiliary signal;

the system further comprises product means for recurrently calculating the product of: the first auxiliary signal; and the difference between the second and third auxiliary signals; and the system further comprises average means for calculating a running average of the calculated products; and M is equal to 1.

11. The system of claim 6, in which:

the analysis means include correlation means for deriving as an analysis signal, a correlation measuring signal indicating the degree of correlation between: the input signal; and a delayed signal equal to the input signal but shifted in time relative to the input signal by a time interval equal to M times the delay time T;

M is equal to Tm/Tp;

Tp is the period of the periodic disturbances;

Tm is a time shift for which the correlation between the input signal and a delayed version of the input signal exhibits a maximum or a minimum;

the system further comprises auxiliary means for deriving, by delay, a first, a second and a third auxiliary signal from the input signal, the second and third auxiliary signals are shifted in time by a first and a second time interval respectively, relative to the first auxiliary signal, the length of the first time interval is a given period of time shorter, and the length of the second time interval is a given period of time longer than M times the delay time;

the system further comprises difference means for deriving as a correlation measuring signal, a difference signal indicating the difference of:
- the correlation between the first and the second auxiliary signal; and
- the correlation between the first and the third auxiliary signal;

the system further comprises product means for recurrently calculating the product of: the first auxiliary signal; and the difference between the second and third auxiliary signals; and the system further comprises average means for calculating a running average of the calculated products; and M is equal to 1.

12. A process for producing a product, comprising the steps of:

measuring a control quantity of the process that exhibits periodic disturbances and providing a measurement signal;

delaying the measurement signal for a delay time approximately equal to the length of the period of the period disturbance;

maintaining a relationship between the delay time and the period of the periodic disturbance, including:
- deriving an analysis signal indicating a deviation between the period of the periodic disturbance and the delay time;
- adjusting the delay time in response to the analysis signal; and adjusting the delayed measurement signal to the process apparatus to regulate the control quantity to reduce the periodic disturbances as the product is produced.

13. The process of claim 12, in which:

deriving the analysis signal includes deriving a correlation measuring signal indicating the degree of correlation between the measurement signal and a delayed signal equal to the measurement signal but shifted in time relative to the measurement signal by a time interval equal to M times the delay time T;

M is equal to Tm/Tp;

Tp is the period of the periodic disturbances; and

Tm is a time shift for which the correlation between the measurement signal and a delayed version of the measurement signal exhibits a maximum or a minimum;

the process further comprises the step of deriving by delay, a first, a second and a third auxiliary signal from the measurement signal, the second and third auxiliary signals are shifted in time by a first and a second time interval respectively, relative to the first auxiliary signal, the length of the first time interval is a given period of time shorter and the length of the second time interval being a given period of time longer than M times the delay time;

deriving the correlation measuring signal includes deriving a difference signal indicating the difference of: the correlation between the first and the second auxiliary signal; and the correlation between the first and the third auxiliary signal;

deriving the difference signal includes recurrently calculating the product of: the first auxiliary signal; and the difference between the second and third auxiliary signals; and calculating a running average of the calculated products; and M is 1.

* * * * *